United States Patent
Kohler et al.

(10) Patent No.: US 8,110,621 B2
(45) Date of Patent: Feb. 7, 2012

(54) CASTOR OIL-BASED POLYOL EMULSIONS

(75) Inventors: Burkhard Kohler, Leverkusen (DE); Gerhard Ruttmann, Burscheid (DE)

(73) Assignee: Bayer MaterialScience AG, Leverkusen (DE)

( * ) Notice: Subject to any disclaimer, the term of this patent is extended or adjusted under 35 U.S.C. 154(b) by 57 days.

(21) Appl. No.: 12/488,006

(22) Filed: Jun. 19, 2009

(65) Prior Publication Data

US 2009/0258970 A1 Oct. 15, 2009

Related U.S. Application Data

(62) Division of application No. 11/639,466, filed on Dec. 15, 2006, now abandoned.

(30) Foreign Application Priority Data

Dec. 24, 2005 (DE) .......... 10 2005 062 269

(51) Int. Cl.
*C04B 28/02* (2006.01)
*C04B 7/00* (2006.01)
*C08G 59/00* (2006.01)
*C08F 20/00* (2006.01)

(52) U.S. Cl. ......... 524/4; 524/310; 252/182.2; 252/182; 525/438; 525/440; 525/482; 106/606

(58) Field of Classification Search .......... 504/244; 524/4, 310; 525/438, 440, 482; 252/182.2; 106/606

See application file for complete search history.

(56) References Cited

U.S. PATENT DOCUMENTS 3,351,574 A 11/1967 Hicks et al.

FOREIGN PATENT DOCUMENTS

| GB | 509929 | 7/1939 |
|---|---|---|
| GB | 1413121 | 11/1975 |
| GB | 2353993 | 3/2001 |
| JP | 2001302304 | 10/2001 |
| JP | 200467463 | 3/2004 |

OTHER PUBLICATIONS

Blue Circle Portland Cements-Health and Safety Information, 2002, LaFarge, Winter, 2 pages.*

* cited by examiner

*Primary Examiner* — Johann Richter
*Assistant Examiner* — Andriae M Holt
(74) *Attorney, Agent, or Firm* — Lyndanne M. Whalen; Noland J. Cheung

(57) ABSTRACT

A polyol emulsion of castor oil and monoepoxides is combined with methylenediphenyl diisocyanate (MDI) and cement to produce a polymer cement.

5 Claims, No Drawings

CASTOR OIL-BASED POLYOL EMULSIONS

BACKGROUND OF THE INVENTION

The present invention relates to polyol emulsions of castor oil and monoepoxides and to polymer cements prepared therefrom together with methylenediphenyl diisocyanate (MDI) and cement.

The preparation of polymer cements from castor oil emulsions, MDI and cement is known and is described in GB 2353993. The castor oil emulsions used there are, however, relatively highly viscous and therefore not optimally processable.

JP 2001-302304 and JP 2004067463 describe polyol emulsions of castor oil and the reaction products of castor oil with monoepoxides. The viscosity of these emulsions is lower than that of pure castor oil emulsions, but the preparation of the ricinoleic acid/monoepoxide adducts requires an additional reaction step.

Furthermore, the ricinoleic acid/monoepoxide adducts still contain OH groups, which are capable of forming hydrogen bridge bonds and thus increase the viscosity.

Emulsions of castor oil and a reactive diluent which contains no OH groups, but, under the basic reaction conditions of the polymer cement formation, forms free OH groups which then react with the MDI with crosslinking are therefore desirable.

SUMMARY OF THE INVENTION

Surprisingly, it has been found that low-viscosity emulsions having the desired properties, which can be reacted with MDI and cement to give polymer cements, can be prepared from castor oil and monoepoxides. Under the reaction conditions of the polymer cement formation, the monoepoxide reacts with ring opening to give the corresponding glycol and thus provide the required OH groups.

DETAILED DESCRIPTION OF THE PREFERRED EMBODIMENTS OF THE INVENTION

The present invention therefore relates to emulsions which include:
25 to 45 parts by weight, preferably 25 to 35 parts by weight, of water,
45 to 69.5 parts by weight, preferably 55 to 63 parts by weight, of castor oil,
5 to 30 parts by weight, preferably 7 to 15 parts by weight, of one or more monoepoxides and
0.5 to 5 parts by weight of auxiliaries and additives.

In the context of the invention, "castor oil" includes esters of glycerol with ricinoleic acid, on average at least two of the OH groups of the glycerol being esterified with ricinoleic acid. Both industrial and pharmaceutical qualities may be used.

In the context of the invention, "monoepoxides" are all compounds having one epoxy group per molecule. Preferred monoepoxides correspond to the general formulae (I) to (IV)

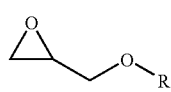

I

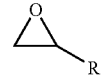

II

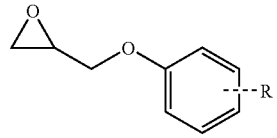

III

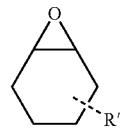

IV in which
R represents a $C_4$- to $C_{18}$-alkyl radical or a tri(m)ethoxysilylpropyl radical and
R' represents a hydrogen atom, a $C_1$- to $C_4$-alkyl radical or a vinyl group.

Monoepoxides represented by the formula I or II are preferably used and those represented by the formula I, particularly those in which R represents a $C_8$- to $C_{16}$-alkyl radical, are most preferably used.

Auxiliaries and additives useful in the practice of the present invention include, for example, nonionic emulsifiers, antifoaming agents and thickeners which, in a preferred embodiment, are present as auxiliaries and additives in the emulsions according to the invention.

Nonionic emulsifiers which may be used include ethoxylated fatty alcohols, alkyl phenols, fatty acid esters of polyethylene oxides, fatty acid esters of sorbitan, ethoxylated sorbitan, block copolyethers of polyethylene oxide with other polyepoxides, preferably polypropylene oxide, ethoxylated fatty amines, fatty amides or glycosides or esters of sugars. It is also possible to use mixtures of nonionic emulsifiers, the HLB (Hydrophile-Lipophile Balance) value of the total mixture being 8 to 19, preferably 10 to 14.

The HLB value is 20 for pure polyethylene oxide and 0 for pure polyolefin, the HLB value being proportional to the polyethylene oxide content. This can be expressed by the formula HLB=20·($M_h$/M), where $M_h$ is the molecular weight of the hydrophilic part of the molecule and M is the molecular weight (Method of Griffin).

Antifoaming agents which may be used in the practice of the present invention include, for example, silicones, silicones containing ether groups, hydrophobic silicas, nonionic emulsifiers having an HLB value of 3 to 10 and mineral oils. Nonionic emulsifiers based on sorbitan esters or mineral oils are preferably used.

Thickeners which may be used in the practice of the present invention include cellulose derivatives, such as hydroxyethyl, methyl, hydroxypropyl or carboxymethyl ethers. Furthermore, polyurethane- or polyurea-based thickeners, inorganic sols, such as aluminum hydroxide, polyvinyl alcohols, polyvinylpyrrolidones or (co)polymers of (meth)acrylic acid or of (meth)acrylamide can be used. Acid-functional polymers are preferably used in the form of their alkali metal or ammonium salts.

Preferred thickeners are cellulose derivatives of the above-mentioned type, most preferably hydroxyethyl cellulose.

The emulsions of the present invention may also include polyols, such as glycerol, oligomeric glycerols, trimethylolethane, triethylolpropane, sugar alcohols, sugars, sugar derivatives or alkoxylated amines, such as triethanolamine or propoxylated ethylenediamine. The amines may be neutralized with carboxylic acids or hydroxycarboxylic acids, such as citric or tartaric acid.

The viscosities of the emulsions according to the invention are typically 50 to 5000 mPa·s, preferably 90 to 300 mPa·s, at 23° C.

The emulsions of the present include, as auxiliaries and additives, preferably 1 to 3 parts by weight, of sorbitan monolaurate as emulsifier and antifoaming agent, with the result that better water resistance of the polymer cements, determined by "bleaching", caused by standing water, is additionally achieved (visual comparison).

Among the suitable auxiliaries and additives, hydroxyalkyl derivatives of cellulose are particularly suitable as thickeners.

In general, auxiliaries and additives which contain isocyanate-reactive groups, such as OH or NH groups, are preferred.

In a particularly preferred embodiment of the present invention, at least 1 part by weight of an ester of sorbitan, at least 0.5 parts by weight of ethoxylated fatty alcohols and at least 0.1 parts by weight of hydroxyethylcellulose are present as auxiliaries and additives.

The preparation of the emulsions according to the invention is effected by mixing the components with shearing using stirrers or jet dispersers. Preferably, the fat-soluble components are pre-dissolved in the castor oil and the water-soluble components are pre-dissolved in the water. It is unimportant whether the aqueous phase is metered into the oil phase, or vice versa.

The invention further relates to polymer cements including:
10 to 25 parts by weight of one of the emulsions according to the invention,
10 to 40 parts by weight of MDI and
35 to 80 parts by weight of cement.

In principle, known phosgenation products of the condensates of aniline with formaldehyde can be used as MDI (methylenediphenyl diisocyanate). These may be both the monomeric MDI isomers having two aromatic 6-membered rings per molecule and the higher molecular weight MDI types which contain three or more aromatic 6-membered rings per molecule. Moreover it is also possible to use the higher molecular weight secondary products based on the above-mentioned MDI types and having isocyanurate, allophanate, urethane, carbodiimide, urethonimine and/or uretdione groups.

MDI which contains 30 to 85% by weight of MDI isomers having two aromatic 6-membered rings per molecule and 15 to 70% by weight of higher molecular weight MDI types which contain three or more aromatic 6-membered rings per molecule is preferably used.

In the context of the invention, "cements" are binders in the form of inorganic, non-metallic, finely divided substances which, when mixed with water, harden independently and remain solid in air or in water, such as, for example, Portland cements, calcium aluminate cements, calcium sulphate cements, hydrated calcium oxides, magnesium oxychloride cements and mixtures thereof with calcium hydroxide, magnesium hydroxide, pigments or sand. The above-mentioned cements are described in detail in GB 1192864. A further description of the cements appears in DIN 1164 PR EN 197/1. Cements such as, for example, Portland cements, iron Portland cements, blast furnace cements, trass cements, blast furnace trass cements, oil shale cements or high-alumina cements which contain at least 23% by weight of CaO, preferably at least 50% by weight of CaO are preferred. The cement mixes used according to the invention preferably contain 1 to 10% by weight of calcium hydroxide (slaked lime).

The preparation of the polymer cements according to the invention is effected by mixing the components with shearing, preferably the emulsion being initially introduced and MDI and cement then being added. After admixing of the MDI, the mixture passes through a viscosity maximum by emulsion inversion from an oil-in-water to a water-in-oil emulsion. The mixture typically hardens after a pot life of 8 to 45 min to give an unfoamed polyurethane which is filled with cement. The polymer cements according to the invention harden at temperatures of from 0° C. to 40° C. at any desired relative humidity and are particularly suitable as a floor coating. However, any desired concrete structures can be coated in order to impart acid resistance to them. The application can be effected by spreading or pouring. During hardening, the escape of carbon dioxide which is formed from the isocyanate/water reaction can be facilitated by rolling over a spiked roller.

EXAMPLES

Castor oil 1 DIN 55939 was used in the examples.
The viscosity was measured in accordance with DIN EN ISO 3219/A3 at a shear gradient of 240 l/s and 23° C.
Polypox R24: $C_{14}$-$C_{16}$-alkyl glycidyl ether, a commercial product available from UPPC AG, Mietingen-Baltringen, Del.
Ruetapox EPD HD: 1,6-hexanediol diglycidyl ether, a commercial product available from Bakelite AG, Duisburg, Del.
Wallinat SML: Sorbitan monolaurate, a commercial product available from Wall Chemie GmbH, Kempen, Del.
Vanquish 100 N-butyl-1,2-benzoisothiazolin-3-one, a commercial product available from Avecia Biocides, Frankfurt am Main, Del.
Byk 501: Solution of foam-destroying polymers, silicone-free, a commercial product available from BYK Chemie GmbH, Wesel, Del.
Natrosol Type
250LR: Hydroxyethylcellulose, the Brookfield viscosity of a 5% strength solution in water at 25° C. is 100-180 mPa·s, a commercial product available from Hercules International Ltd., G M Rijswijk, NL
Tergitol 15S40: $C_{15}$-monoalkyl ether of a polyethylene glycol having a degree of polymerization of 40, a commercial product available from DOW Chemical Company, Midland, Mich., USA
Desmodur® XP 2551: Oligomeric MDI, a commercial product available from Bayer MaterialScience AG, Leverkusen Del.
The following was used as a cement mix (1 kg):
735 g of sand, particle size range: 0.3 mm-0.8 mm
9 g of inorganic pigment (Fe2O3)
222 g of Portland cement, white
31 g of calcium hydroxide
3 g of white oil (mineral oil)

The processing time was measured by treating the applied layer with a spiked roller. The end of the processing time is reached when, on determination by visual assessment the indentations due to the spiked roller no longer coalesce.

Example 1

According to the Invention

A mixture of 60 kg of castor oil, 10 kg of Polypox R24, 1.85 kg of Wallinat SML, 0.1 kg of Vanquish 100 and 1.2 kg of Byk 501 was initially introduced into a vessel with shearing, and a mixture of 32 kg of demineralized water, 1 kg of Natrosol Type 250LR and 0.65 kg of Tergitol 15S40 was pumped in. An emulsion which remained stable after 30 days at room temperature, after 30 days at 50° C. and after 30 days at 3° C. was obtained. The viscosity was 140 mPa·s at 23° C.

116 g of this mixture were mixed first with 157.9 g of Desmodur XP 2551 and then with 726 g of the cement mix with shearing. The processing time was 18 min.

Example 2

Comparative

The procedure was as described in Example 1, with the exception that Polypox R24 was replaced with the same amount of Ruetapox EPD HD. An emulsion which remained stable after 30 days at room temperature, separated off an aqueous phase of 0.1 cm height at a height of fill of 5.5 cm after 30 days at 50° C. and remained stable after 30 days at 4° C. was obtained. The viscosity was 210 mPa·s at 23° C.

116 g of this mixture were mixed first with 157.9 g of Desmodur XP 2551 and then with 726 g of the cement mix with shearing. The processing time was 8 min, which is too short for safe processing.

Example 3

Comparative

The procedure was as described in Example 1, with the exception that Polypox R24 was replaced by the same amount of n-butylbenzyl phthalate. An emulsion which remained stable after 30 days at room temperature, after 30 days at 50° C. and after 30 days at 3° C. was obtained. The viscosity was 190 mPa·s at 23° C.

Example 4

Comparative

The procedure was as described in Example 1, with the exception that Polypox R24 was replaced by the same amount of additional castor oil. An emulsion which remained stable after 30 days at room temperature, after 30 days at 50° C. and after 30 days at 3° C. was obtained. The viscosity was 270 mPa·s at 23° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer cement comprising:
   (1) from 10 to 25 parts by weight of an emulsion comprising:
      a) from 25 to 45 parts by weight of water,
      b) from 45 to 69.5 parts by weight of castor oil,
      c) from 5 to 30 parts by weight of monoepoxide and
      d) from 0.5 to 5 parts by weight of auxiliaries and additives,
   (2) from 10 to 40 parts by weight of MDI (methylenediphenyl diisocyanate) and
   (3) from 35 to 80 parts by weight of cement.

2. The polymer cement of claim 1 in which (2) is a mixture of from 30 to 85% by weight of MDI isomers having two aromatic 6-membered rings per molecule and from 15 to 70% by weight of higher molecular weight MDI homologs containing three or more aromatic 6-membered rings per molecule.

3. The polymer cement of claim 2 in which the cement contains at least 23% by weight of CaO and from 1 to 10% by weight of calcium hydroxide.

4. The polymer cement of claim 1 in which the cement contains at least 23% by weight of CaO and from 1 to 10% by weight of calcium hydroxide.

5. A molded article produced from the polymer cement of claim 1.

* * * * *